C. E. KRATZER.
STEERING MECHANISM FOR AUTOMOBILE HEADLIGHTS.
APPLICATION FILED SEPT. 10, 1914.
1,134,464.
Patented Apr. 6, 1915.
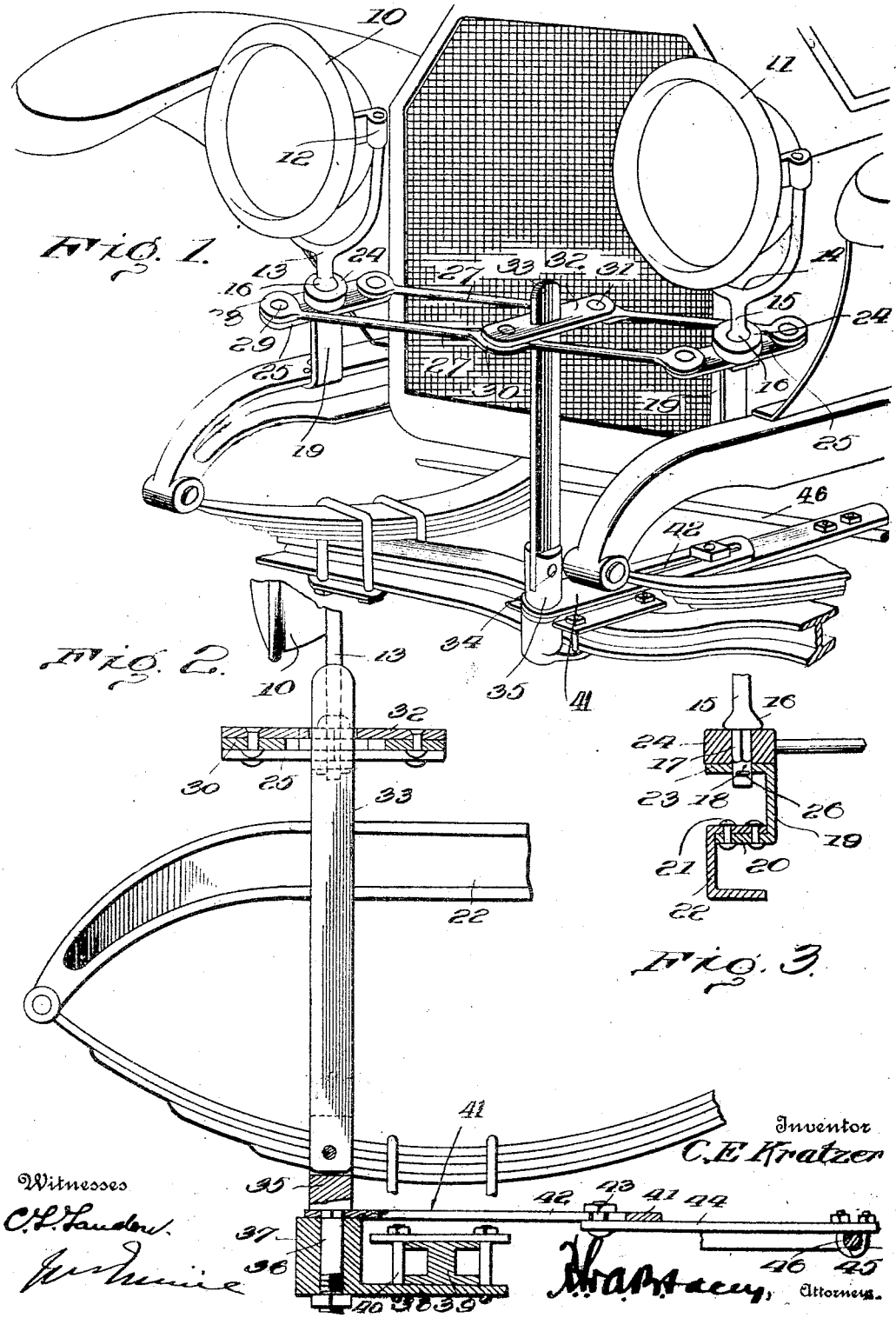

UNITED STATES PATENT OFFICE.

CHARLES E. KRATZER, OF NEW VIENNA, OHIO.

STEERING MECHANISM FOR AUTOMOBILE-HEADLIGHTS.

1,134,464.  Specification of Letters Patent.  Patented Apr. 6, 1915.

Application filed September 10, 1914.  Serial No. 861,067.

*To all whom it may concern:*

Be it known that I, CHARLES E. KRATZER, citizen of the United States, residing at New Vienna, in the county of Clinton and State of Ohio, have invented certain new and useful Improvements in Steering Mechanism for Automobile-Headlights, of which the following is a specification.

My invention relates to new and useful improvements in automobile head lights, and aims as its principal object to provide a mechanism whereby the head lights will be automatically swung to project their light in the line of travel of the vehicle at all times, whether the vehicle be proceeding straight ahead, or be taking a turn.

A further object is to provide a head light steering mechanism which is of extreme simplicity in construction, but nevertheless durable and efficient in service, and may be easily and readily applied to any standard form of automobile without requiring any change in the parts thereof.

The above recited and other incidental objects of a similar nature, which will be hereinafter more specifically treated, are accomplished by such means as are illustrated in the accompanying drawings, described in the following specification, and then more particularly pointed out in the claims, which are appended hereto and form a part of this application.

With reference to the drawings, wherein there has been illustrated the preferred embodiment of this invention as it is reduced to practice, and throughout the several views of which similar reference characters designate corresponding parts, Figure 1 is a perspective view showing the mechanism applied to an automobile; Fig. 2 is a vertical section taken through the front axle and the steering mechanism at a central point thereof; and Fig. 3 is a section on the line 3—3 of Fig. 1.

In the accompanying drawings, the numerals 10 and 11 designate a pair of head lights which may be of standard construction and are removably secured as by tubular brackets 12 to the upper ends of a pair of fork members 13 and 14. The members 13 and 14 are of the usual construction, except as regards the formation of their spindles 15. As shown in Fig. 3, particularly, the shanks of these members 13 and 14 are provided adjacent their lower terminals with annular shoulders 16. That portion of each spindle which lies below the shoulder 16 is squared, as indicated at 17, while the extreme lower terminal portion 18 of the spindle is rounded.

In supporting the members 13 and 14, I employ a pair of bracket members 19. These members 19 are similar in construction, and each consists of a single strip of metal which is bent into a substantially U-shape, the one arm of the U, which is indicated at 20, being secured, as by rivets 21, to the upper horizontal portion of the chassis side member 22, so as to space the other arm 23 above the member 22. Between each upper arm 23 and the adjacent shoulder 16 is interposed the hub or collar member 24. The hubs 24 are formed intergrally with the link plates 25. It will be seen, particularly upon reference to Fig. 3, that the hub members 24 are held against rotation on the spindles 15 by the squared portions 17 thereof. At the same time, the link members 25 may rotate freely on the arms 23 of the brackets 19. It should be noted that a cotter pin, indicated at 26, prevents the withdrawal of the spindle from the arm 23, and that the shoulder 16 of each spindle bears against the adjacent hub member 24.

The link plates 25 are connected by parallel rods 27, the terminals of which are provided with circular apertured enlargements 28 to receive a pivot pin 29. It is to be observed that the rearwardly disposed rod 27 is terminally pivoted to the rear terminals of the members 25, while the forwardly disposed member 27 is pivotally secured at its terminals to the forward ends of the members 25.

At the approximate center of each member 27 there is formed a circular plate 30. These plates are apertured to receive the pivot pins 31 by which a connecting plate 32 is freely secured at its terminals to the rod. In the approximate center of this plate 32 is formed a longitudinally extending slot which is adapted to removably receive the upper terminal of the bar member 33. The lower terminal of this bar member 33 is secured as by a bolt or similar fastening device 34 within a bifurcation formed in the hub 35. This hub 35 is provided with a spindle 36, the extreme lower terminal of which is threaded and is passed through a bearing 37. The bearing 37 is provided with a supporting arm or plate 38 which is engaged against the lower face of the axle 39 and is secured in the proper position thereagainst by means of U-bolts 40, in the manner best shown in Figs. 1 and 2. The portion of the spindle 36 which lies immediately adjacent the head 35 is square, so that the connecting bar 41 will be held against rotation with respect to the hub. This bar 41 extends rearwardly from the top of the axle and is longitudinally slotted, as indicated at 42, to receive a bolt 43 by which the member 41 is freely secured to an arm 44. The rear terminal of this arm 44 is rigidly secured, as by a U-bolt 45, to the bar 46 which ordinarily connects the steering knuckles in all standard forms of steering mechanisms.

From the foregoing description, it will be readily observed that, when the steering wheel is manipulated to turn the front wheel of the vehicle, the arm 44 will be moved transversely and will, consequently, cause, through the medium of the bar 41, the turning of the hub 35. When the hub 35 turns, the bar member 33, of course, causes the connecting plate 32 to turn. The turning movement of the member 32 is communicated to the plates 25 and, consequently, to the brackets 13 and 14 and lamps 10 and 11 by means of the rods 27.

In concluding the description of the invention, it is desired to direct particular attention to the fact that all the elements of the head light steering mechanism are of such design that they may be easily and quickly attached to any automobile of standard type without requiring any special form of front axle or chassis.

In reduction to practice, it has been found that the form of this invention illustrated in the drawings, and referred to in the above description as the preferred embodiment, is the most efficient and practical; yet realizing that the conditions concurrent with the adoption of this device will necessarily vary, it is desirable to emphasize the fact that various minor changes in details of construction, proportion and arrangement of parts may be resorted to, when required, without sacrificing any of the advantages of this invention, as defined in the appended claims.

Having thus described the invention, what is claimed as new is:—

1. In dirigible headlights for vehicles, the combination with the connecting rod of a vehicle steering gear, of lamp brackets supported for turning movement, connecting means between the brackets, means carried by said connecting means and formed to receive a bar, a vertically disposed rotatable bar engaging said last mentioned means whereby turning of the bar will reciprocate the connecting means, and an operative connection between the connecting rod and bar whereby reciprocation of the connecting rod will turn the bar.

2. In dirigible head lights for vehicles, the combination with the connecting rod of the vehicle steering gear, of lamp brackets supported for turning movement, connecting means between the brackets, a vertically disposed rotatable bar, an operative connection between the bar and the connecting means whereby turning of the bar will reciprocate the connecting means, and an operative connection between the connecting rod and bar whereby reciprocation of the connecting rod will turn the bar, said latter means including arms rigidly secured to the bar and connecting rod and having pivotal sliding connection with each other.

3. In dirigible head light mechanism for vehicles, the combination with the connecting rod of the steering gear, of brackets carried by the vehicle frame, lamp supporting brackets journaled in the first brackets, link plates rigidly connected to the lamp supporting brackets, rod connecting the free ends of the link plates and extending in parallel spaced relation, a connecting plate pivotally secured at its free ends to the intermediate portions of the rods and provided centrally with a slot, a bar supported in vertical position and for rotation with one end extending through the slot of the connecting plate, an operative connection between the bar and connecting rod of the steering gear whereby reciprocation of the connecting rod will turn the bar.

4. In dirigible head lights for vehicles, the combination with the connecting rod of the steering gear, of a vertically disposed bearing, a head member rotatable in the bearing and provided with a vertically disposed slot, connecting means between the rod and head member whereby reciprocation of the rod will turn the head member, a bar pivoted in the slot of the head, a plate slotted to slidably receive the upper end of the bar and be turned thereby, connecting rods pivotally secured intermediate their length to the ends of the plate, link plates pivotally connecting the adjacent free ends of the connecting rods, and lamp supporting brackets carried by the link plates to swing upon swinging of the link plates.

5. In dirigible head lights for vehicles, the combination with the connecting rod of the steering gear, of lamp brackets supported for turning movement, link plates secured intermediate their lengths to the lamp brackets to turn therewith, connecting rods pivotally connecting the free ends of the link plates, a connecting plate pivotally connecting the intermediate portions of the connecting rods, and an operative connection between the connecting plate and the connecting rod of the steering gear whereby reciprocation of the connecting rod will cause turning of the connecting plate.

6. A dirigible head light mechanism adapted for operative connection to the connecting rod of a vehicle steering gear and including lamp brackets supported for turning movement, substantially parallel connecting means between the brackets, a rotatable bar extending between said connecting means and operatively connected therewith, and an operative connection between the connecting rod and said bar, whereby reciprocation of the connecting rod will turn the lamp brackets.

7. A dirigible head light mechanism adapted for operative connection to the connecting rod of a vehicle steering gear and including lamp brackets supported for turning movement, connecting means between said brackets, a bar having free connection with said connecting means, said bar being mounted to rotate, and a slidable connection between the connecting rod and said bar, whereby reciprocation of the connecting rod will turn the lamp brackets.

8. A dirigible head light mechanism adapted for operative connection to the connecting rod of a vehicle steering gear and including lamp brackets supported for turning movement, link plates having hubs formed thereon rigidly engaging the brackets, connecting means between said link plates, a plate having pivotal connection with said connecting means, a bar extending freely through said plate, said bar being mounted to rotate, and an operative connection between the connecting rod and bar, whereby reciprocation of the connecting rod will turn the lamp brackets.

9. A dirigible head light mechanism adapted for operative connection to the connecting rod of a vehicle steering gear and including lamp brackets supported for turning movement, connecting means between said brackets, a plate operatively connecting said first mentioned means, the said plate being formed to freely receive a bar, a rotatably mounted bar operatively engaging the plate, and an operative connection between the said bar and connecting rod, whereby reciprocation of the connecting rod will turn the lamp brackets.

10. A dirigible head light mechanism adapted for operative connection to the connecting rod of a vehicle steering gear and including lamp brackets supported for turning movement, connecting means between said brackets, a rotatably mounted hub, a bar mounted to rotate with the hub and freely connected to said first mentioned means, and an operative connection between the bar and connecting rod, whereby reciprocation of the connecting rod will turn the lamp brackets.

In testimony whereof I affix my signature in presence of two witnesses.

CHARLES E. KRATZER. [L. S.]

Witnesses:
E. H. EDWARDS,
JEFF CLARK.

Copies of this patent may be obtained for five cents each, by addressing the "Commissioner of Patents, Washington, D. C."